July 5, 1966     P. B. CHRISTENSEN     3,259,256
BOX CAR UNLOADER
Filed April 24, 1964     4 Sheets-Sheet 1
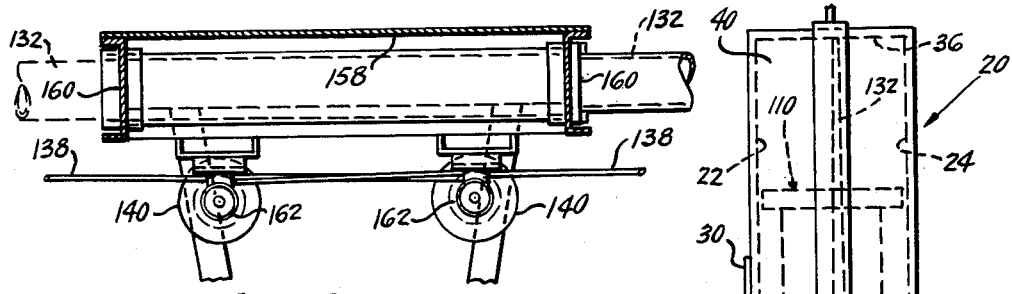
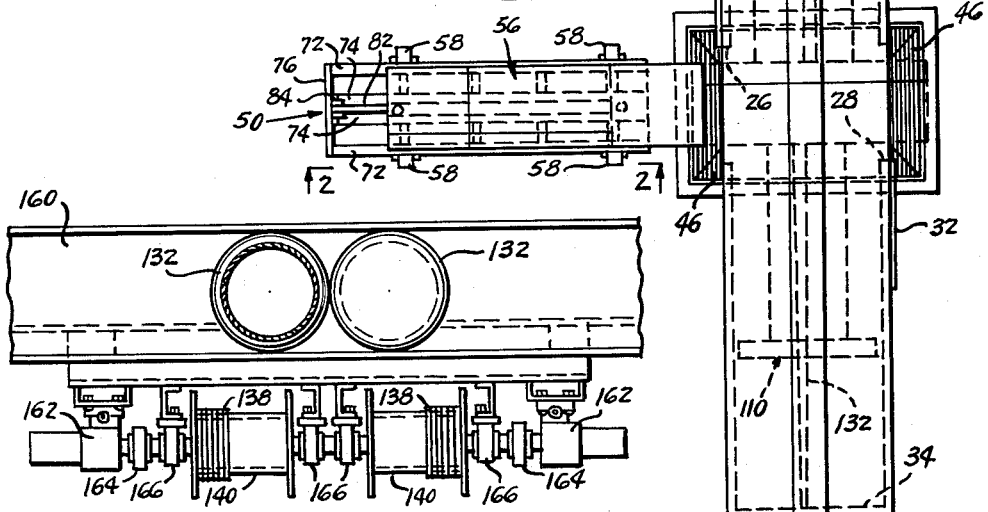
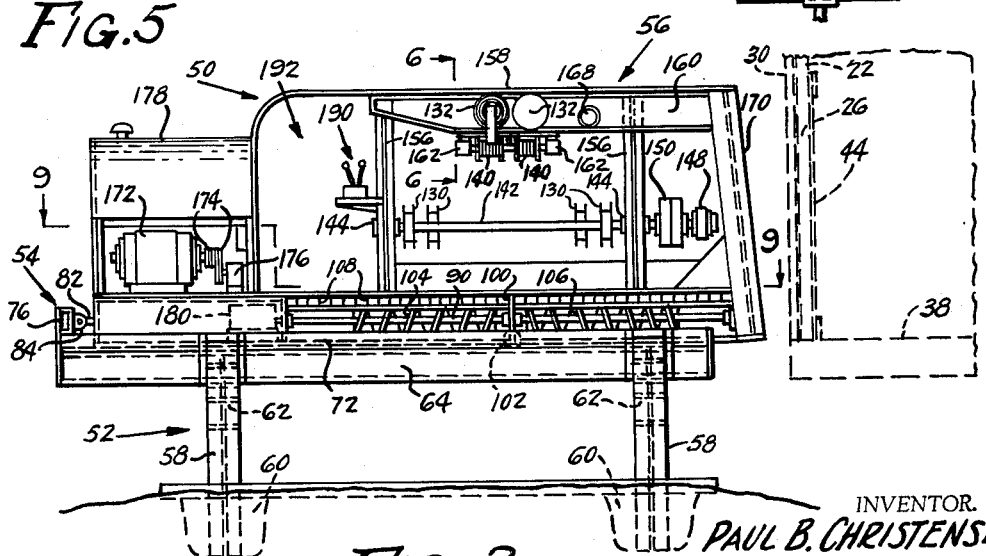
INVENTOR.
PAUL B. CHRISTENSEN
BY
Kimmel & Crowell
ATTORNEYS.

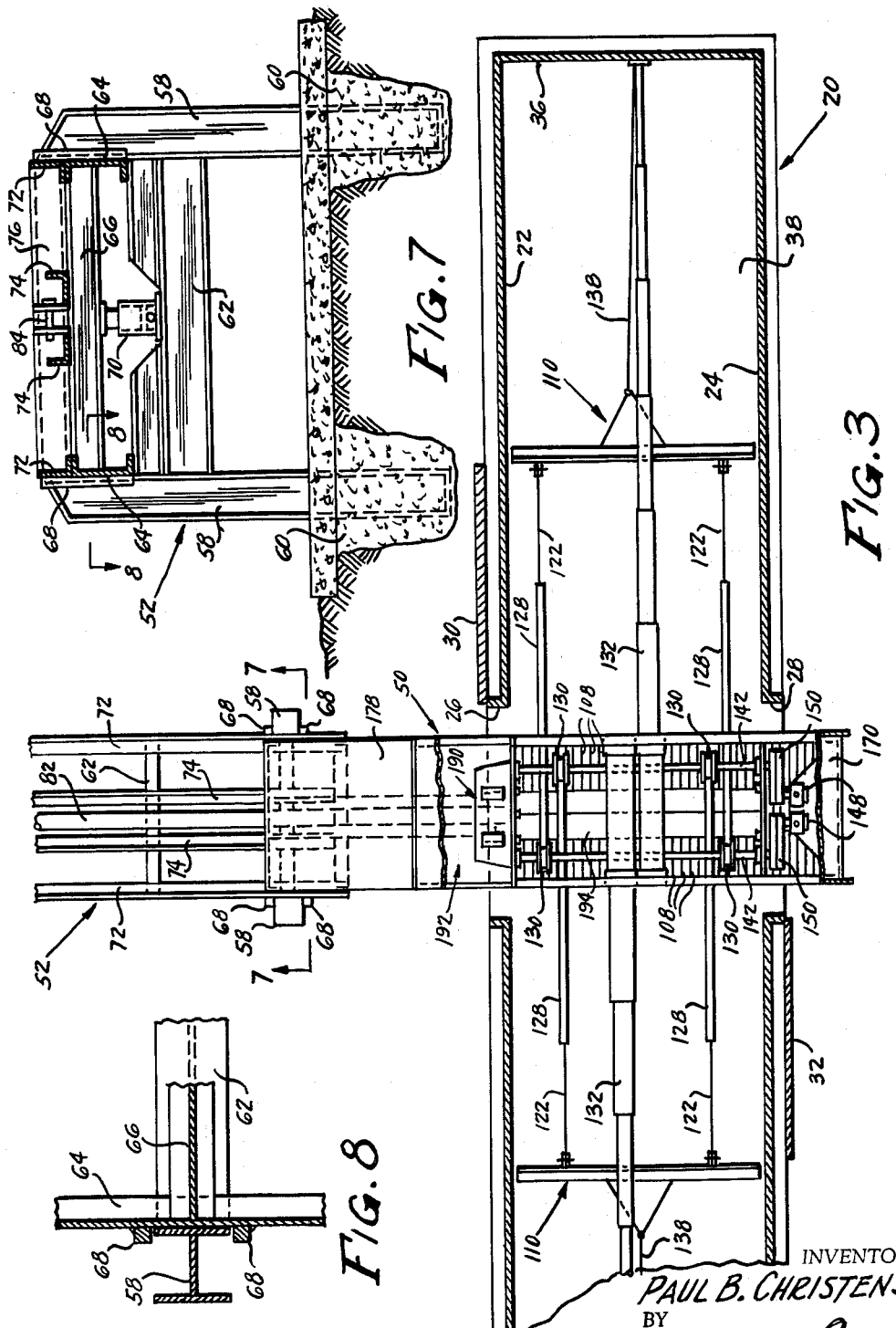

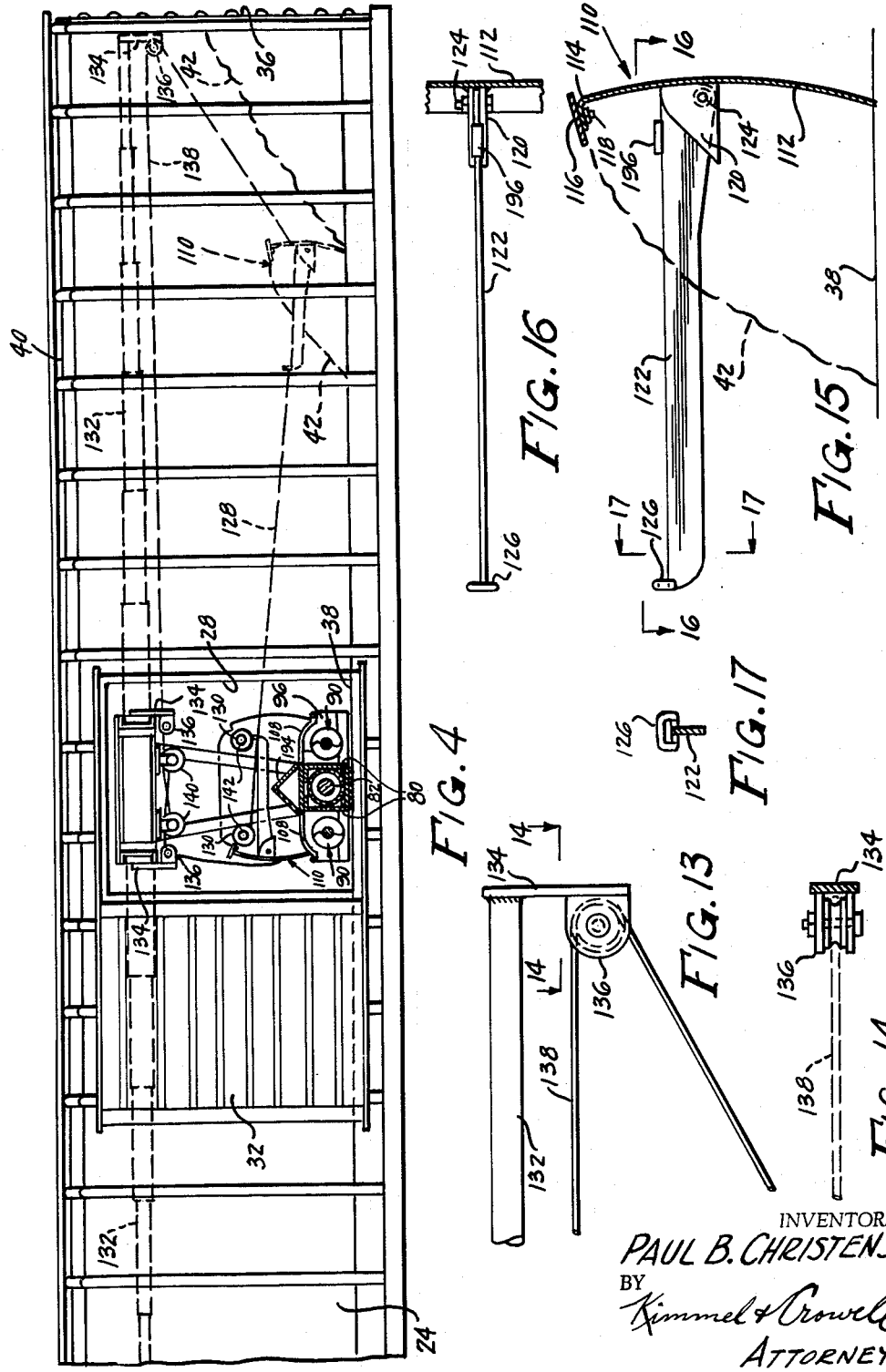

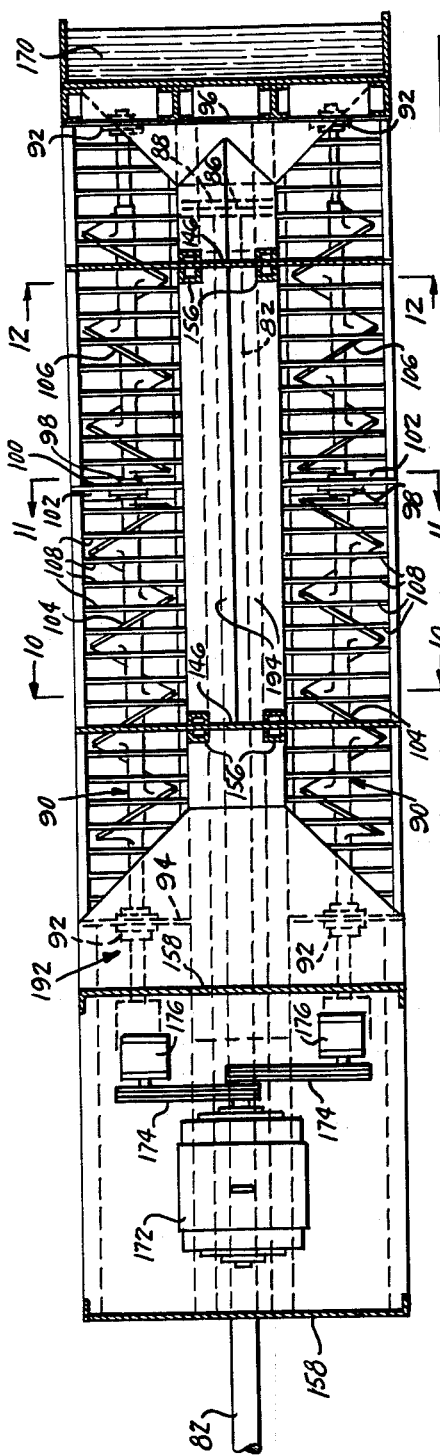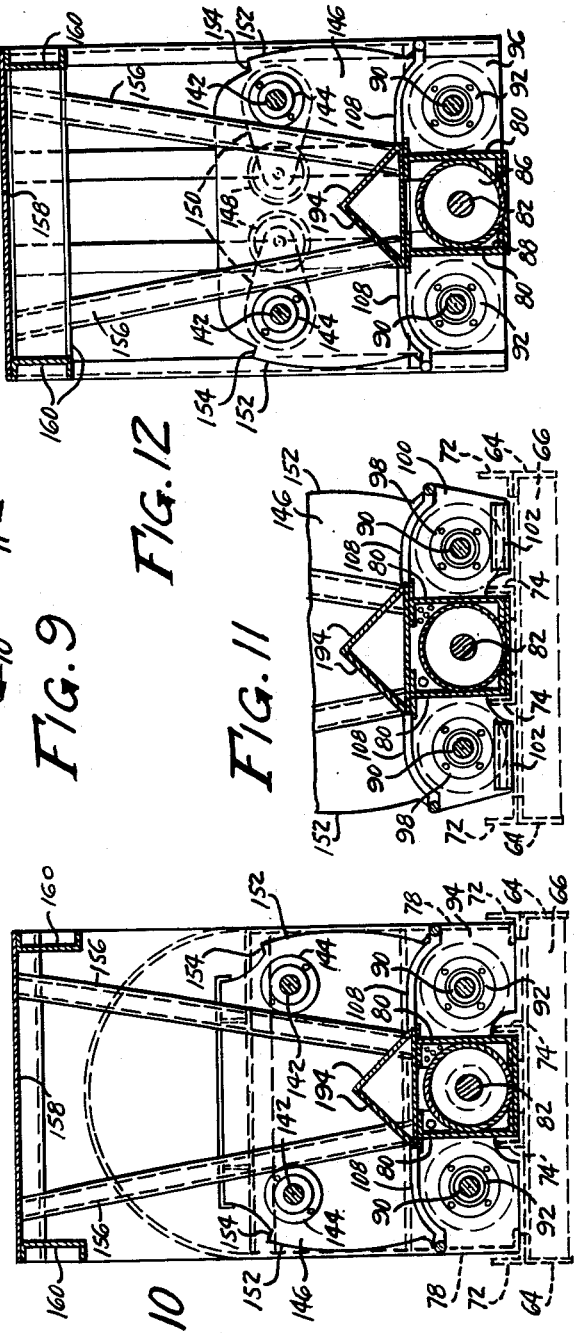
INVENTOR.
PAUL B. CHRISTENSEN
BY
Kimmel & Crowell
ATTORNEYS.

3,259,256
BOX CAR UNLOADER
Paul B. Christensen, 216 First Nat'l Bank,
Fremont, Nebr.
Filed Apr. 24, 1964, Ser. No. 362,323
12 Claims. (Cl. 214—44)

This invention relates to a box car unloader and more particularly to a device for removing a particulate material such as grain from a boxcar or the like.

A primary object of this invention is the provision of a boxcar unloader which is sturdy and durable in construction and reliable and efficient in operation.

Another object of this invention is the provision of a boxcar unloader which functions in an advantageous manner to remove grain or the like from within the boxcar and dump the same into a hopper associated with a grain elevator or the like.

A further object of this invention is the provision of a device of the type described, which enters a boxcar from the side door of the same and includes a conveyor means such as a screw auger which runs from the interior of the boxcar out the door to dump gain into a hopper below the door, with material board scoop means extendable transversely into the two end portions of the boxcar for moving grain to the conveyor means.

Yet another object of the instant invention is the provision of a boxcar unloader having a breaker means attached to the front of the same for removing the conventional wooden or paper bulkhead normally carried over the side door of the boxcar prior to entry of the device therethrough.

Another object of this invention is the provision of a boxcar unloader which is vertically adjustable to accommodate boxcars of various heights.

A further object of this invention is to provide such a device having material board scoop means which will automatically be positioned substantially vertically to pull the grain from the ends of the boxcar, and which will pivot to a substantially flat position when being withdrawn toward the ends of the boxcar for picking up a new quantity of grain.

Other and further objects reside in the combination of elements, arrangement of parts, and features of construction.

Still other objects will in part be obvious and in part be pointed out as the description of the invention proceeds and as shown in the accompanying drawings wherein:

FIGURE 1 is a top plan view of the device of the instant invention operatively associated with a boxcar or the like, various portions of the device being shown within the boxcar in unloading position in dotted lines;

FIGURE 2 is an enlarged side elevational view of the device taken substantially on line 2—2 of FIGURE 1 with various elements broken away for illustrative clarity and convenience, and with a portion of a boxcar to be unloaded shown in dotted lines;

FIGURE 3 is an enlarged fragmentary top plan view of the device of the instant invention in the unloading position within a boxcar, various parts being broken away for illustrative clarity and convenience;

FIGURE 4 is an enlarged fragmentary side elevational view of a boxcar showing the unloader of the instant invention operatively associated therewith, one of the material board means being illustrated in dotted lines in its unloading position and the other material board means being illustrated in full lines in its inoperative or transporting position;

FIGURE 5 is an enlarged fragmentary view of the withdrawing rams and winches;

FIGURE 6 is an enlarged fragmentary side sectional view of the same taken on line 6—6 of FIGURE 2;

FIGURE 7 is an enlarged fragmentary transverse cross-sectional view of a carrier and unloader frame means taken substantially on line 7—7 of FIGURE 3;

FIGURE 8 is an enlarged fragmentary cross-sectional view of the beam construction taken substantially on line 8—8 of FIGURE 7;

FIGURE 9 is an enlarged fragmentary top sectional view particularly showing the augers and grates therefor and the main motor and hydraulic pump means taken substantially on line 9—9 of FIGURE 2;

FIGURE 10 is a transverse cross-sectional view taken substantially on line 10—10 of FIGURE 9;

FIGURE 11 is a fragmentary transverse cross-sectional view taken substantially on line 11—11 of FIGURE 9;

FIGURE 12 is a transverse cross-sectional view taken substantially on line 12—12 of FIGURE 9;

FIGURE 13 is an enlarged fragmentary side elevational view of the end portion of one of the withdrawing rams;

FIGURE 14 is a horizontal cross-sectional view taken substantially on line 14—14 of FIGURE 13;

FIGURE 15 is an enlarged vertical cross-sectional view through one of the material board means;

FIGURE 16 is a fragmentary horizontal cross-sectional view taken substantially on line 16—16 of FIGURE 15; and FIGURE 17 is a transverse cross-sectional view taken substantially on line 17—17 of FIGURE 15.

Similar reference characters refer to similar parts throughout the several views of the drawing.

Referring now to the drawings, a conventional boxcar or other such transport device is designated generally by the reference numeral 20 and includes basically oppositely disposed side walls 22, 24 having aligned openings 26, 28 selectively closed by sliding side doors 30, 32 in a well known manner, oppositely disposed end walls 34, 36, a bottom or floor 38 and a top or roof 40. The boxcar 20 is filled in any conventional manner through either or both side door openings 26, 28 with a particulate material 42 such as grain or the like, after which the openings 26, 28 are at least partially closed by a wooden or paper bulkhead 44 to preclude loss of the particulate material 42, the side doors 30, 32 then being closed for transport. During the unloading operation the boxcar 20 is spotted or positioned with its side door openings 26, 28 overlying a grating 46 covering a dump bin or hopper operatively associated in any conventional manner with a grain elevator or the like (not shown).

The unloader device of the instant invention is designated generally by the reference numeral 50 and comprises basically a carrier frame means 52, an unloader frame means 54 supported on the carrier frame means 52 and an unloading means 56 supported on the unloader frame means 54.

The carrier frame means 52 includes a plurality of spaced, vertically extending support beams 58 having their lower ends sunk in a concrete foundation 60 (note particularly FIG. 7), with interconnecting cross braces 62 to define a rigid frame work. Longitudinally extending channels 64, interconnected by cross braces 66 are vertically slidable within the support beams 58 and carry positioning members 68 guidingly receiving the support beams 58. A lifting means in the form of a vertically disposed hydraulic ram 70 operates between transverse braces 62 and 66 to render the carrier frame means 52 vertically adjustable whereby the unloader frame means 54 may be aligned with side door openings of boxcars of different heights. Elongated side angle members 72, central angle members 74, and an end push block 76 are supported by the transverse braces 66 and the channel members 64, the side and central angle members 72, 74 defining guide means for the unloader frame means 54 and the push block 76 defining an abutment utilized in moving the unloader frame means 54 on the carrier frame means 52 as will be explained in more detail hereinafter.

The unloader frame means 54 includes elongated side channel members 78 and central channel members 80 slidingly received in channel members 72, 74, respectively of the carrier frame means 52.

A transport means in the form of a horizontally disposed hydraulic ram 82 operates within the central channel members 80 of the unloader frame means 54 and is operatively interconnected at one end to the push block 76 by connector means 84 and carries an abutment plate 86 at its opposite end secured to a bulkhead 88 extending between the central channel members 80 of the unloader frame means 54 at a convenient location. The transport means 82 move the unloader frame means 54 from an inoperative position where it is supported by the carrier frame means 52 outside of the boxcar 20 as shown, for example, in FIGURES 1 and 2, to an unloading or operative position wherein it extends transversely into the boxcar 20 through at least one of the side door openings 26, 28 and preferably through both of the side door openings as shown, for example, in FIGURE 3.

The unloading means 56 includes conveyor means, preferably in the form of auger means 90 extending longitudinally of the unloader frame means 54 on both sides of the central channel members 80 and being supported in bearings 92 carried by end support plates 94, 96, and bearings 98 carried by central support plate 100, the support plates being secured to at least the central channel members 80 of the unloader frame means 54 for movement therewith and at least the central support plate 100 having heavy duty pipes or tubular members 102 secured to the bottom thereof to facilitate sliding movement of the unloader frame means 54 with respect to the carrier frame means 52. When the unloader frame means 54 is to be extended completely through both side door openings 26, 28 of the boxcar 20, the auger means 90 are preferably provided with oppositely directed portions 104, 106 having reverse screw convolutes extending from within the boxcar 20 through the respective side door openings.

A plurality of grade rods 108 overlie the auger means 90 in longitudinally spaced relationship whereby particulate material may be fed therethrough to the auger means for conveyance out of the boxcar 20.

A pair of material board means 110 form part of the unloading means 56 each including a material board member 112 extending substantially the full width of the boxcar 20 between the sides 22 and 24 and adapted in a manner to be more fully explained to carry particulate material 42 to the auger means 90 for removal through the side openings 26, 28. The material board members 112 are arcuate as will be seen particularly in FIGURE 15 and have an upper flange 114 to which is secured a rubber lip 116 by bolts 118 to partially prevent particulate material 42 from passing over the top of the material board members 112. Bifurcated brackets 120 are secured in any conventional manner to the front of the material board members 112, arm members 122 being carried at one end by pivot means 124 extending through the brackets 120. The opposite end of the arms 122 defines eyes for attachment of flat return cable means 128 operatively carried by return winch means 130 to pull the material board means 110 away from the ends 36, 38 of the boxcar 20 and toward the auger means 90.

A withdrawing means is provided for pulling the material board means 110 back toward the ends 36, 38 of the boxcar 20 to pick up more particulate material 42. The withdrawing means include oppositely disposed telescopic hydraulically operated rams 132 carrying plate members 134 as shown particularly in FIGURE 13 on their ends for abuttingly engaging the end walls 36, 38 of boxcar 20, each plate member 134 having secured thereto pulley means 136 over which the intermediate portion of a withdrawing cable means 138 is trained, one end of each withdrawing cable means 138 being operatively connected to a withdrawing winch means 140 and the other end being connected to the rear of one of the material board members 112.

The return winch means 130 are rotatably supported on shafts 142 in staggered relationship, the shafts being carried in bearings 144 on front and rear partitions 146, motors 148 and reducers 150 being operatively connected to each shaft 142.

The side edges 152 on the partitions 146 are formed to the shape of the material board mmebers 112 and have an inwardly directed upper shoulder 154 corresponding to the lip 116, these portions of the partitions 146 and the edges of the grade rods 108 defining a support means for the material board mean 110 when the material board means are in the inoperative position of the unloader frame means and during movement of the unloader frame means through the side openings 26, 28 of the boxcar 20 to the unloading position. Note particularly FIGURE 4 wherein the left hand material board means 110 is shown supported thereby.

The partitions 146 carry upwardly and angularly extending brace members 156 which support an overhead cover 158 surrounding the unloading means 56. Channels 160 depend from the cover 158 to carry the telescoping rams 132 and the withdrawing winch means 140, these latter elements each carrying a motor 162 and connector means 164 in a conventional manner, bearing means 166 supporting the same. Floodlights 168 may also be carried by the channels 160 if desired.

A breaker means 170 is carried by the leading edge of the unloader frame means 54 and is pushed through the frangible door opening cover member 44 to break the same on movement of the unloader frame means 54 to the unloading position within the boxcar 20.

A main motor 172 is also carried by the unloader frame means 54 and is operatively connected by belts 174 to hydraulic pumps 176 operatively interconnected in any conventional manner by hydraulic conduits (not shown) to an oil supply tank 178 and to each of the motors 148 for driving the return winch means 130, 162 for driving the withdrawing winch means 140 and to other conventional motors 180 for driving the auger means 90, the pumps 176 also supplying hydraulic power to the telescoping rams 132, the transport means 82 and the lifting means 70 in any conventional manner. Each of these elements is actuated by control means 190 within an operator's enclosure 192 defined by one of the partitions 146 and the cover 158.

The use and operation of the device of the instant invention will now be apparent. The boxcar 20 is positioned with its side openings 26, 28 over the grating 46 and the carrier frame means 52 is vertically adjusted to align the unloader frame means 54 with one of the side door openings in the boxcar. An operator actuates the control means 190 in any conventional manner to expand the horizontally disposed hydraulic ram 82 defining the transport means which moves the unloader frame means 54 and the unloading means 56 carried thereby into the boxcar 20, the breaker means 170 removing the frangible side door opening cover 44 during this movement. When the cover 44 has been removed a percentage of the particulate material 42 spills out the side door openings 26, 28 through the grating 46 to the hopper or the like therebeneath. The unloader frame means 54 is continued in its forward movement until it extends completely through both side door openings 26, 28 as shown in FIGURE 3, the material board means 110 being carried on the support means defined by the side edges 152 and the shoulder 154 of the partitions 146 and the grate rods 108 until the unloader frame means 54 reaches the unloading position. The operator then actuates the telescoping rams 132 and the withdrawing and return winch means 140, 130, respectively, to first withdraw the material board means 110 toward the ends 34, 36 of the boxcar 20, then returning the material board means 110 to carry a quantity of the particulate material 42 to the grate rods 108 through which it passes to be carried by the auger means 90 out of the side door openings 26, 28 of the boxcar 20. A hopper cover 194 is provided in the longitudinal space between the grate rods 108 to guide the particulate material 42 from the material board means 110 toward the auger means 90. The withdrawing and return operations of the material board means 110 are successively repeated until all the particulate material 42 has been removed from the boxcar 20. On each withdrawal of the material board means 110, the material board member 112 pivots about the pivot means 124 secured to the arm means 122 to allow the material board members 112 to ride over the particulate material 42. On the return operation the material board members 112 pivot to a substantially vertical operative position, stop members 196 on the arms 122 limiting the pivotal movement between the arms and the material board members 112.

After the unloading operation has been completed, the material board means 110 are returned to their transporting position wherein they are carried by the unloader frame means 54, and the transport means 82 is retracted to withdraw the unloader frame means 54 unto the carrier frame means 52. The boxcar 20 can then be moved and a new boxcar positioned over the grating 46 for unloading.

It will now be seen that there is herein provided an improved boxcar unloader device which satisfies all of the objectives of the instant invention, and others, including many advantages of great practical utility and commercial importance.

Since many embodiments may be made of this inventive concept, and since many modifications may be made of the embodiments hereinbefore shown and described, it is to be understood that all matter herein is to be interpreted merely as illustrative, and not in a limiting sense.

I claim:

1. A device for removing a particulate material such as grain from a boxcar or the like having oppositely disposed side walls and oppositely disposed aligned door openings, and oppositely disposed end walls, comprising a carrier frame means, an unloader frame means supported on said carrier frame means, and unloading means supported on said unloader frame means, transport means operatively interconnected between said carrier frame means and said unloader frame means for moving said unloader frame means from an inoperative position wherein it is supported by said carrier frame means exterior to the boxcar to an unloading position wherein it extends transversely into the boxcar through the side door opening of the same, said unloading means including conveyor means extending longitudinally of said unloader frame means from within the boxcar through the side door opening of the same when said unloader frame means is in said unloading position, a pair of material board means, withdrawing means operatively connected to each of said material board means for moving the same perpendicularly with respect to said unloader frame means and in opposite directions towards the end walls of the boxcar, and return means operatively connected to each of said material board means for moving the same away from the end walls of the boxcar whereby said material board means carries particulate material to said conveyor means, said unloader frame means extending transversely across the boxcar through both side door openings in said unloading position, and said conveyor means including oppositely directed unloading portions extending from within the boxcar through both side door openings, for carrying said particulate material out of the side door openings.

2. The structure of claim 1 wherein the side door opening of the boxcar is covered by a frangible cover member to normally preclude loss of the particulate material therethrough, a breaker means carried by the leading edge of said unloader frame means, said breaker means being pushed through the frangible cover member to break the same on movement of said unloader frame means to said unloading position.

3. The structure of claim 1 wherein said carrier frame means includes adjustable lifting means to raise and lower the same whereby said unloader frame means may be aligned with the side door openings of boxcars of different heights.

4. The structure of claim 3 wherein said lifting means includes a vertically disposed hydraulic ram.

5. The structure of claim 1 wherein said transport means includes a horizontally disposed hydraulic ram.

6. The structure of claim 1 wherein said conveyor means includes an auger means, grate means overlying said auger means, said material board means pushing the particulate material through said grate means into operative engagement with said auger means on actuation of said return means.

7. The structure of claim 6 wherein the boxcar includes oppositely disposed, aligned, side door openings, said unloader frame means extending transversely across the boxcar through both side door openings in said unloading position, and said auger means including oppositely directed screw members extending from within the boxcar through both side door openings.

8. The structure of claim 1 wherein said material board means each extend substantially the full width of the boxcar.

9. The structure of claim 1 wherein said withdrawing means includes oppositely disposed telescopic hydraulic rams, end plates on each of said rams abuttingly engaging the end walls of the boxcar in said unloading position, pulley means carried by each of said end plates, a withdrawing winch means associated with each of said rams, and a withdrawing cable means associated with each of said withdrawing winch means, each withdrawing cable means having one end operatively connected to its associated withdrawing winch means and its other end secured to the rear of one of said material board means, the intermediate portion of each withdrawing cable means being trained over one of said pulley means.

10. The structure of claim 9 wherein each of said material board means includes a material board member and arm members secured to the front of said material board member, said return means including return winch means for each material board means, a return cable means associated with each return winch means, each return cable means having one end operatively connected to its associated return winch means and its other end secured to one of said arms.

11. The structure of claim 10 wherein said arm members are pivotally secured to the front of said material board members whereby said material board members may be moved from a substantially vertically extending return position to a flattened withdrawing position.

12. The structure of claim 1 further including support means carried by said unloader frame means for supporting said material board means in said inoperative position of said unloader frame means and during movement of the same to said unloading position.

References Cited by the Examiner
UNITED STATES PATENTS

| | | |
|---|---|---|
| 1,443,240 | 1/1923 | Pratt. |
| 1,626,984 | 5/1927 | Sundberg. |
| 2,219,926 | 10/1940 | Jensen. |
| 2,613,003 | 10/1952 | Buck. |
| 2,812,867 | 11/1957 | Anderson _____ 214—44 |
| 3,073,463 | 1/1963 | Addicks _____ 214—44 |

GERALD M. FORLENZA, *Primary Examiner.*

A. J. MAKAY, *Assistant Examiner.*